Oct. 7, 1969  J. S. KAMBORIAN ET AL  3,470,849
CEMENT EXTRUDING MECHANISM

Original Filed July 16, 1965  4 Sheets-Sheet 1

INVENTORS
Jacob S. Kamborian
Walter A. Vornberger
James H. Arsenault

BY  Albert Gordon

ATTORNEY

United States Patent Office 3,470,849
Patented Oct. 7, 1969

3,470,849
CEMENT EXTRUDING MECHANISM
Jacob S. Kamborian, 70 Crestwood Road, West Newton, Mass. 02165, and Walter A. Vornberger, Medford, and James H. Arsenault, Whitinsville, Mass.; said Vornberger and said Arsenault assignors to said Kamborian
Application May 23, 1967, Ser. No. 640,611, which is a division of application Ser. No. 472,525, July 16, 1965, now Patent No. 3,397,417. Divided and this application Nov. 12, 1968, Ser. No. 774,899
Int. Cl. B05c *1/06, 11/10*
U.S. Cl. 118—410
4 Claims

ABSTRACT OF THE DISCLOSURE

A deflector arrangement located contiguous to a cement applicator for accumulating surplus cement after the cement has been extruded from the applicator against a workpiece.

---

This is a division of application Ser. No. 640,611 filed May 23, 1967 which in turn is a division of application Ser. No. 472,525 filed July 16, 1965 and is now Patent No. 3,397,417.

This invention relates to a machine that incorporates a mechanism for extruding molten cement from an applicator onto a workpiece, herein disclosed as an insole, and the disposition of any surplusage of cement applied against the insole. A thermoplastic cement is used that is solid at ambient temperatures, becomes molten when heated above a predetermined temperature and reverts to its solid condition when cooled below the predetermined temperature. The applicator is heated so that the cement can be applied against the insole in molten form, and any surplusage of cement is guided from the applicator through flow guides onto a relatively cool deflector where the surplus cement solidifies.

Figure 1:
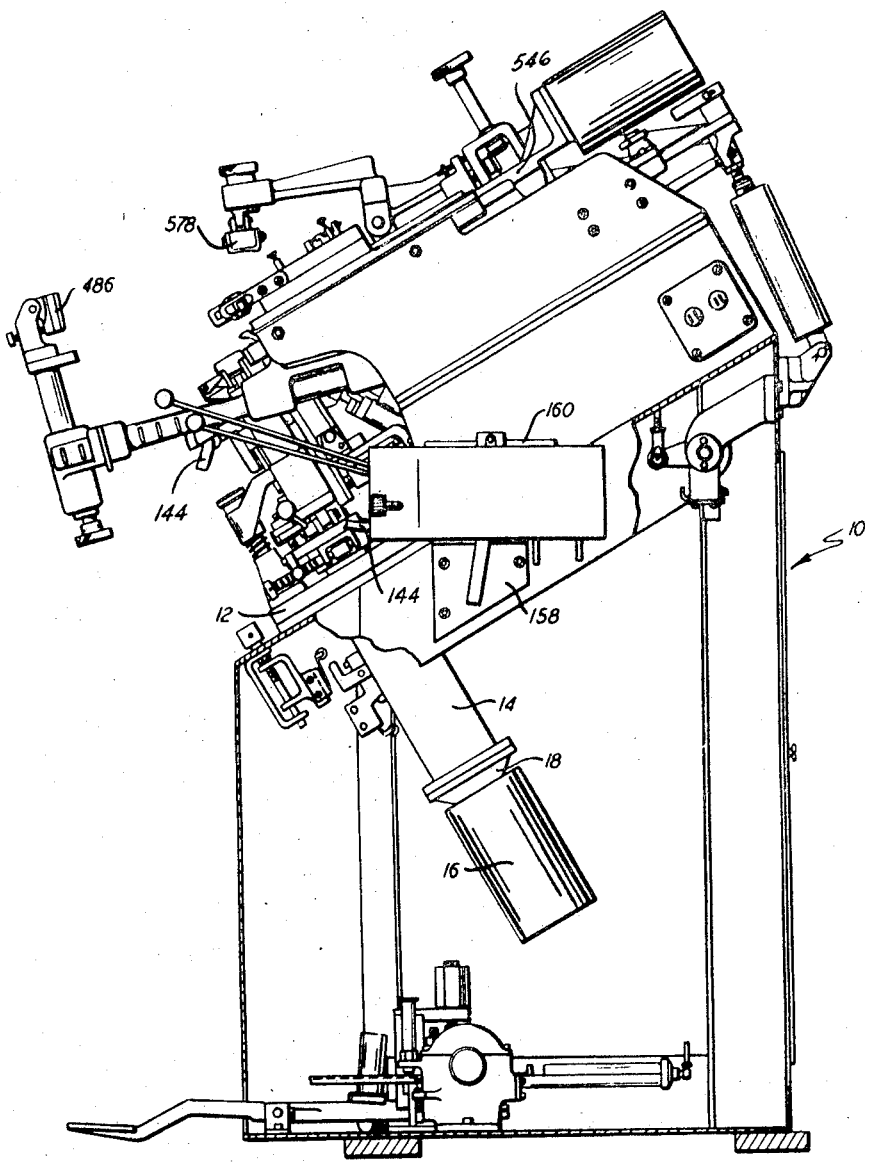
FIGURE 1 is a side elevation of a machine that forms an illustrative embodiment of the invention.
Figure 2:
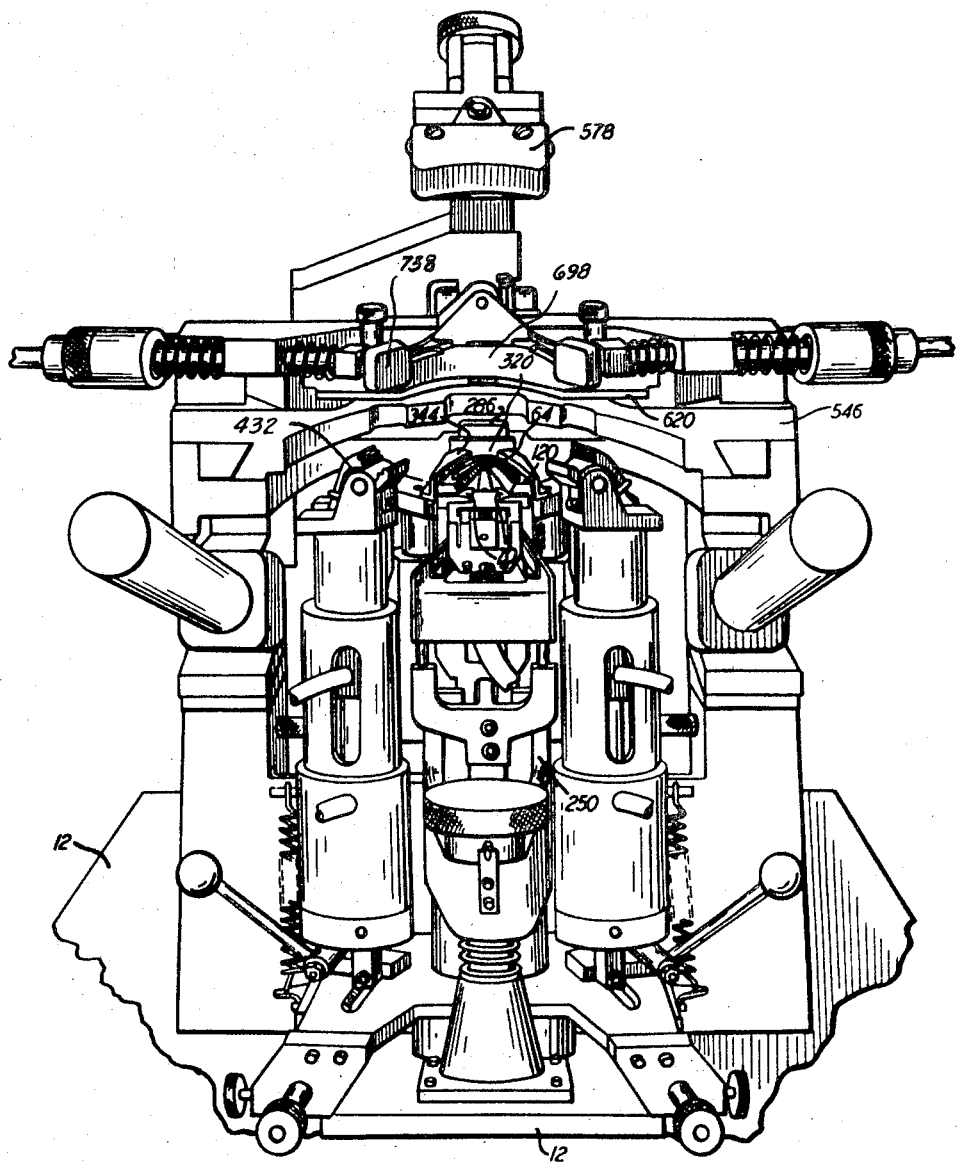
FIGURE 2 is a front elevation of the upper portion of the machine.

Referring to FIGURES 1 and 2, the machine includes a frame 10 that incorporates a base plate 12 that has a sleeve 14 extending downwardly therefrom. For convenience of operation, the machine is inclined about 30 degrees from the horizontal. However, parts extending in the direction of the plate 12 will hereafter be referred to as extending horizontally and parts extending in the direction of the sleeve 14 will hereafter be referred to as extending vertically. The operator is intended to be located to the left of the machine as seen in FIGURE 1, and a direction extending toward the operator (right to left in FIGURE 1) will be referred to as "forward" while a direction extending away from the operator (left to right in FIGURE 1) will be referred to as "rearward."

An air operated motor 16 is secured to a cap 18 at the bottom of the sleeve 14, and a toe post 20 (FIGURES 3 and 4) is secured to the piston rod (not shown) of the motor 16 to extend vertically and be slidable within the sleeve 14. A toe post extension 44 is secured to the upper end of the post 20. A bar 46 is secured to the toe post 20. A bar 46 is secured to the toe post extension 44. A toe insole rest 64 and a pair of forepart insole rests 70 are secured to and extend upwardly of the bar 46.

A rearwardly extending ledge 84 of the post extension 44 has a hanger 86 depending therefrom. An air operated motor 88 is pivoted to the hanger 86. The piston rod 90 of the motor 88 is pivoted to a link 92, and the link 92 is pivoted to a pair of toggle links 94 and 96. The link 96 extends downwardly of the link 92 and is pivoted to the post extension 44 while the link 94 extends upwardly of the link 92 and is pivoted to a slide 98 that is guided for vertical sliding movement by the post extension 44 and a bearing plate 48 that is secured to the post extension 44. A mount 100 is secured to the slide 98 and has a pair of front prongs 102 and a rear prong 104 extending upwardly thereof. Upwardly extending compression springs 106 are seated in each of the prongs 102, 104. Each of the springs 106 bears against a rod 108 to yieldably urge the rods upwardly. Pins 110 in the rods 108 ride in slots 112 in the prongs 102, 104 and normally bear against the tops of the slots to limit the extent of upward movement of the rods 108.

The pins 110 are connected by way of pin and slot connections 114 (FIGURE 4) to a bracket 118. A ferrule 115 extends through and is secured to the bracket 118 and extends through an applicator-support 120 that rests on the bracket 118. The applicator-support 120 comprises a base section 122 that lies below the insole rests 64, 70 and an upwardly extending and forked extruding and support section 124 that has a pair of legs 125 diverging forwardly and downwardly from an apex. The extruding section 124 lies outwardly of the insole rest 64. The section 124, which has a configuration corresponding to the margin of the toe portion of the insole of a shoe to be toe lasted, is secured to the bracket 118 by a fastening member such as a nut 125a threaded onto the ferrule 115 and by aligning pins 127. A groove 126 is provided in the top of the extruding-support section 124 and a plurality of holes 128 intersect the groove 126 and extend downwardly therefrom. The holes 128 intersect channels 130 (FIGURE 6) in the top of the base section 122. The ferrule 115 has holes 134 and 136 therein that are in communication with the channels 130. A strut 138, secured to the undersurface of the bracket 118, has a passage 141 therein that is in communication with the hole 134. An adapter 142 on the forward end of the strut 138 has a hollow, flexible conduit 144 secured thereto. A passage 146 in the adapter 142 provides communication between the passage 141 and the conduit 144. An electric heating element 148 in the bracket 118 is provided to heat the applicator-support 120. The conduit 144 is made of a tube that is thermally and electrically insulative and has an electric resistor wire 150 running therethrough that is connected to a source of electrical energy.

A deflector arrangement 151 (FIGURES 4–6) is secured to the base section 122 and extends forwardly thereof. The deflector arrangement comprises longitudinally extending gutters 156 positioned below the forward ends of the applicator legs 125 below and immediately to the front of the extruding section 124 and a transverse gutter 154 connecting the gutters 156. A deflector plate 152, having a relatively large bearing area, is in communicaton with the forward ends of the gutters 156. A cut-out 157, bounded by the gutters 154 and 156 and the plate 152, accommodates the insole rest mount plate 46.

Referring to FIGURE 1, a bracket 158 is secured to the frame 10 and supports a source of cement in the form of a cement pot 160. The end of the conduit 144 remote from the adapter 142 is connected to the cement pot, and the cement pot has means associated therewith, shown in detail in the aforementioned parent applications, actuable to extrude molten cement through the conduit 144 and ultimately to the applicator extruding section 124.

Figures 3, 4, 5, 6:
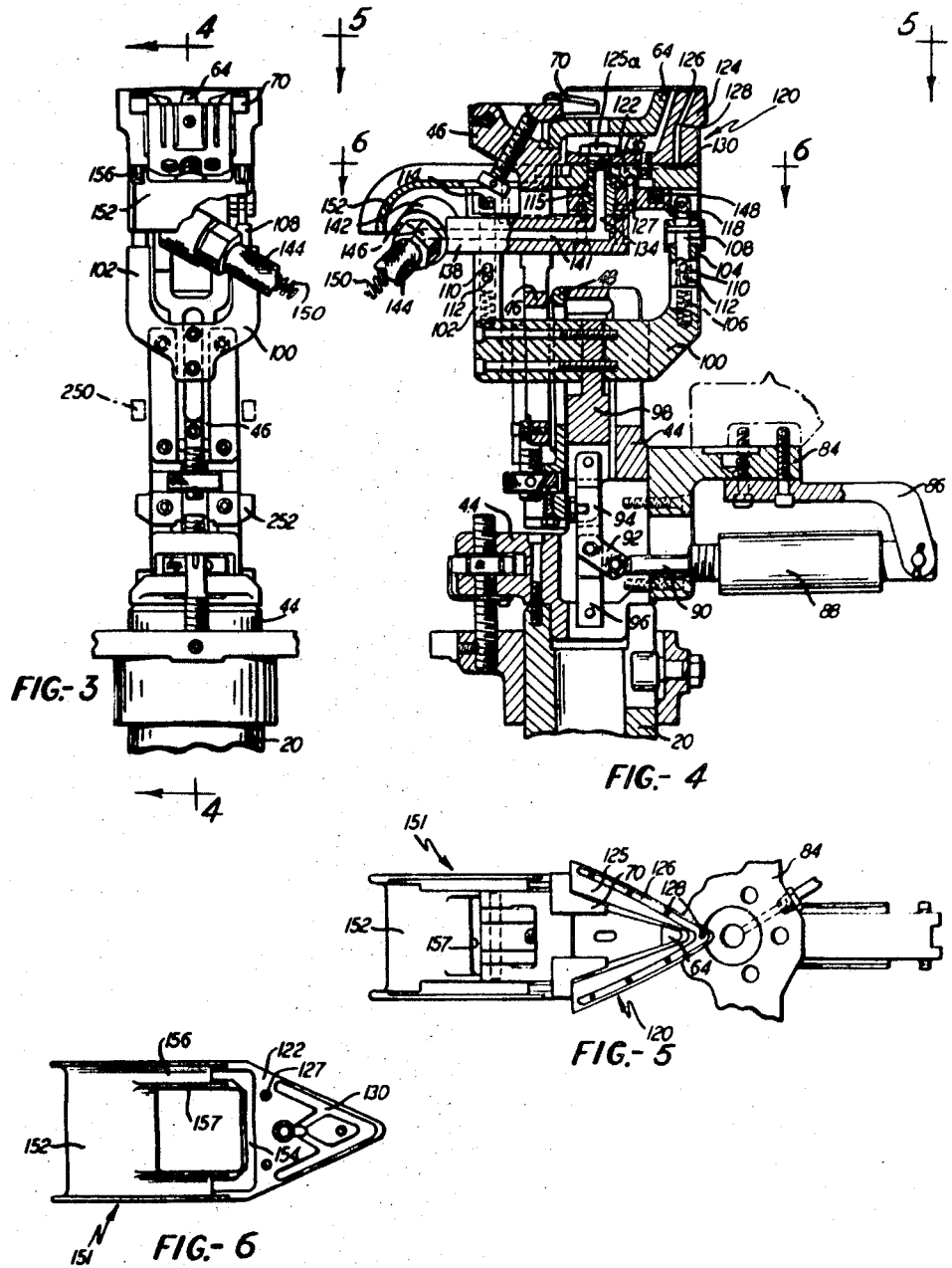
FIGURE 3 is a front elevation of a portion of the machine including an arrangement for supporting a shoe assembly.
FIGURE 4 is a section taken on the line 4—4 of FIGURE 3.
FIGURE 5 is a plan view taken on the line 5—5 of FIGURE 4.
FIGURE 6 is a view taken on the line 6—6 of FIGURE 4.

In the idle condition of the machine, as described more fully in the aforementioned parent applications, the motor 16 and the insole rests 64, 70 carried thereby are in a lowered condition and the motor 88 is in the FIGURE 4 position so that the applicator 120 is in an upper position urged to a level slightly higher than the level of the insole rests 64, 70 by the springs 106.

Figure 7:
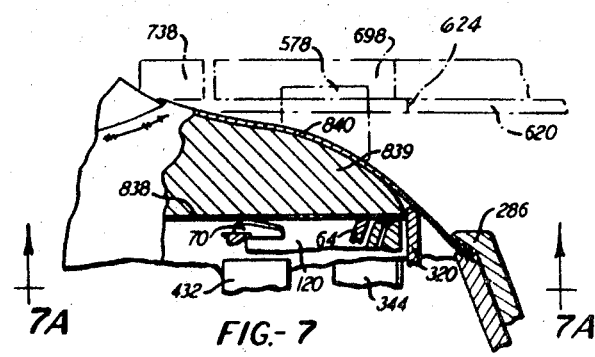
FIGURE 7 is a representation of a shoe assembly as it appears in the machine.
Figure 7A:
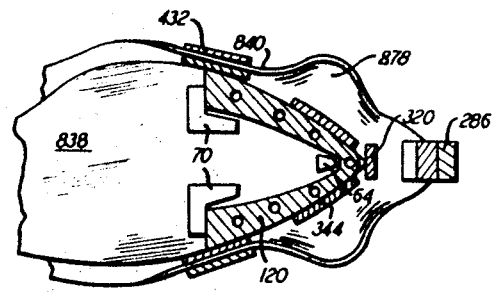
FIGURE 7A is a view taken on the line 7A—7A of FIGURE 7.

Referring to FIGURES 7 and 7A, a shoe assembly is presented bottom-down to the machine to be pulled over and toe lasted. The shoe assembly comprises a shoe insole 838 located on the bottom of a last 839, preferably by being tacked thereto, and a shoe upper 840 draped over the last. The insole is brought to bear against the top of the applicator 120, which at this time is resiliently urged above the level of the insole rests 64, 70 by the springs 106, so that the applicator bears against and supports the margin of the toe portion of the insole. The outer periphery of the last is caused to bear against a front retarder 320 and side retarders 344 so that the retarders act as gauges to accurately locate the shoe assembly in the machine. The toe end of the upper margin is placed between the open jaws of a front pincers 286 and the forepart portions of the upper margin are inserted between the open jaws of side pincers 432.

The operator now actuates the machine to first close the jaws of the front pincers 286 on the toe end portion of the upper margin and then to cause the side pincers 432 to grip the forepart portions of the upper margin. After this the front pincers 286 are caused to move downwardly and rearwardly away from the last to thereby stretch the toe portion of the upper margin about the toe end of the last and the side pincers 432 are caused to move downwardly to stretch the forepart portions of the upper margin about the last. The portions of the stretched upper margin between the front and side pincers are outspread into dog ears 878.

As stated above, when the shoe assembly was placed in the machine, the applicator 120 was resiliently urged above the level of the insole rests 64, 70 by the springs 106, this causing the insole 838 to be located above the insole rests. The downward pulling action of the pincers 286 and 432 causes the applicator to move downwardly against the forces of the springs 106 until the insole 838 comes into engagement with the insole rests. Due to the fact that the applicator is connected by the pin and slot connections 114 to the three prongs 102, 104 the applicator is capable of having limited universal tilting movement with respect to a horizontal plane during its downward movement, so that at the end of its downward movement it will conform to and bear snugly against the insole regardless of the fact that the insole bottom does not lie in a true horizontal plane. At the end of the downward movement of the applicator, the insole is therefore supported at its margin by the applicator 120, which prevents the insole margin from drooping downwardly of the last, and is supported interiorly of its margin by the insole rests 64, 70.

Figure 8:
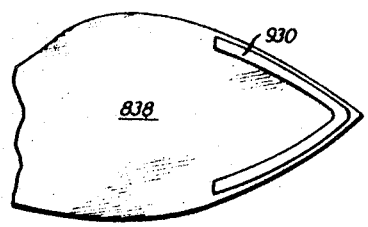
FIGURE 8 is a representation of the bottom of the insole with cement applied thereto.

The operator now causes a slide plate 546 (FIGURE 1) to move from a rearward out-of-the-way position to a forward working position. Toward the end of the forward movement of the slide plate, the motor 16 is actuated to raise the post 20 and the parts carried thereby until tangs 252 (FIGURE 3) mounted to and extending outwardly of the post extension 44 engage lugs 250 (FIGURE 2) mounted to the base plate 12. During this rise of the toe post the cement extruding mechanism associated with the cement pot 160 is actuated to extrude a predetermined quantity of molten cement through the holes 128 and groove 126 of the applicator 120 against the bottom of the margin of the insole 838 to thereby form a cement ribbon 930 on the insole as shown in FIGURE 8. Also, during the rise of the shoe assembly, a holddown 578 is forced against the top of the forepart of the rising shoe under relatively low pressure.

The aforementioned forward movement of the slide plate brings wipers 620, a yoke 698 and bumpers 738 to a position where they can act on the shoe assembly as indicated in phantom in FIGURE 7. When the rise of the toe post is terminated, the insole bottom is above the level of the tops of the wipers 620 an amount that is approximately equal to the thickness of the margin of the upper 840. The rise of the shoe assembly enables the yoke 698 to snugly engage the upper 840 and cause the upper to snugly conform to the shape of the last 839 during the rise. The parts are so constructed that the side retarder blades 344 and the front retarder blade 320 rise during the rise of the shoe assembly, the rising side retarder blades 344 are caused to press the dog ears 878 against the bottoms of the wipers 620 under relatively light pressure, and the rising front retarder 320 is caused to press the portion of the upper stretched by the front pincers 286 against the bottoms of the wipers 620 immediately to the rear of a wiper vertex 624.

At or near the end of the rise of the toe post 20 and at or near the time that the front retarder 320 has forced the upper margin against the wiper bottoms, the front pincers 286 are opened to release the toe end portion of the upper margin and the front pincers are moved downwardly and rearwardly.

At the completion of the rise of the toe post 20, a heel clamp 486 (FIGURE 1) is caused to bear against the heel of the shoe assembly, the yoke 698 is forced against the toe and forepart of the shoe assembly under greater than had heretofore been applied, the bumpers 738 are forced against the foreparts of the upper in regions that are rearward of the yoke 698 and the side retarders 344 are forced upwardly to press the dog ears 878 against the bottom of the wipers 620 under greater pressure than had heretofore been applied. After this, the side pincers 432 are opened to release the forepart portions of the upper margin and the side pincers are lowered away from the shoe assembly.

Now the wipers 620 are moved forwardly and inwardly in a wiping stroke to cause the wipers to engage the upper margin while the upper is tightly stretched about the last to wipe or fold the upper margin against the insole 838 and to bond the upper margin to the insole by means of the ribbon cement 930 on the insole. As the wipers perform their wiping stroke, the motor 88 is actuated to lower the applicator 120 out of the path of the wipers, the front retarder 320 is lowered away from the wiper bottoms, the motor 16 is actuated to lower the insole rests 64, 70 out of the path of the wipers and the hold-down 578 is forced downwardly against the forepart of the shoe assembly under greater pressure than had heretofore been applied. After a predetermined time interval all of the machine parts return to their idle conditions and the machine cycle is completed.

The upper surface of the extruding-support section 124 is inclined inwardly as indicated in FIGURE 4 to enable it to conform to the insole bottom, and due to the machine being inclined as aforesaid, the applicator is inclined downwardly from right to left as seen in FIGURE 4. Therefore, any surplusage of molten cement that is applied to the insole during each machine cycle will gravitationally flow inwardly of the upper surface of the section 124, down its interior side walls and onto the upper surface of the base section 122 and from the base section into the gutters 154 and 156 and then onto the deflector plate 152.

Since the sections 124 and 120 are heated by the heating element 148 and the deflector arrangement 151 is not, the molten cement will not solidify until it strikes the relatively cool deflector arrangement and will accumulate thereon. The upper surface of the deflector arrangement is preferably coated with a material from which the solid accumulation of cement may be readily peeled such as Teflon.

We claim:

1. A mechanism for extruding molten cement, that is normally solid and that becomes molten when heated above a predetermined temperature, against a workpiece comprising: an applicator section having an inclined upper surface against which the workpiece is adapted to bear; means for heating the section above said predetermined temperature; means for extruding the molten cement from said surface against the workpiece, a deflector arrangement, located below said upper surface, that has a temperature below said predetermined temperature; and flow guide means interposed between said upper surface and the deflector arrangement so constructed and arranged as to enable any surplusage of molten cement to gravitationally flow from said upper surface onto said deflector arrangement whereby the surplusage may solidify and accumulate on the deflector arrangement.

2. A mechanism for extruding molten cement, that is normally solid and that becomes molten when heated above a predetermined temperature, against a workpiece comprising: an applicator section having an inwardly inclined upper surface against which the workpiece is adapted to bear; a base section located contiguous to and inwardly of the applicator section at a lower level than said upper surface; means for heating the applicator section and base section above said predetermined temperature; means for extruding the molten cement from said surface against the workpiece; a deflector arrangement located contiguous to and extending forwardly of the base section, said deflector arrangement having a temperature below said predetermined temperature; and means so mounting the applicator section, base section and deflector arrangement as to impart to them a forwardly downward inclination; whereby any surplusage of molten cement may flow gravitationally from said upper surface, down the base section and onto the deflector arrangement and solidify and accumulate on the deflector arrangement.

3. A mechanism for extruding molten cement, that is normally solid and that become molten when heated above a predetermined temperature, against a workpiece comprising: an applicator section formed by an apex and legs extending forwardly and divergently from the apex, said applicator section having an inwardly inclined upper surface against which the workpiece is adapted to bear; a base section located contiguous to and interiorly of the applicator section at a lower level than said upper surface; means for heating the applicator section and base section above said predetermined temperature; means for extruding the molten cement from said surface against the workpiece; a deflector arrangement located contiguous to and extending forwardly of the base section, said deflector arrangement having a temperature below said predetermined temperature; and means so mounting the applicator section, base section and deflector arrangement as to impart to them a forwardly downward inclination; whereby and surplusage of molten cement may flow gravitationally from said upper surface, down the base section and onto the deflector arrangement and solidify and accumulate on the deflector arrangement.

4. The mechanism as defined in claim 3 wherein said deflector arrangement comprises; a gutter located contiguous to the forward end of the base section and extending between the forward ends of said legs; and a deflector plate having a relatively large bearing surface in communication with the gutter.

References Cited

UNITED STATES PATENTS

| | | | |
|---|---|---|---|
| 3,039,121 | 6/1962 | Weinschenk | 12—10.1 |
| 3,390,411 | 7/1968 | Benken | 118—410 X |

WALTER A. SCHEEL, Primary Examiner

JOHN P. McINTOSH, Assistant Examiner